United States Patent

Slangan et al.

[11] 3,982,009
[45] Sept. 21, 1976

[54] GRAPE FLAVOR COMPOSITIONS, FOODSTUFFS AND CHEWING GUM CONTAINING BIS (CYCLOHEXYL) DISULFIDE AND METHODS FOR PRODUCING SAME

[75] Inventors: Gary Slangan, Toms River; Alan O. Pittet, Atlantic Highlands; Christopher Giacino, Califon; Denis E. Hruza, Sr., Bricktown, all of N.J.; Edward J. Shuster, Brooklyn, N.Y.

[73] Assignee: International Flavors & Fragrances Inc., New York, N.Y.

[22] Filed: Aug. 12, 1975

[21] Appl. No.: 603,918

Related U.S. Application Data

[63] Continuation-in-part of Ser. No. 518,818, Oct. 29, 1974, Pat. No. 3,917,870, which is a continuation-in-part of Ser. No. 401,665, Sept. 28, 1973, abandoned.

[52] U.S. Cl. ................................ 426/3; 426/535
[51] Int. Cl.² .......................................... A23L 1/235
[58] Field of Search ............... 260/608; 424/336; 426/535, 3

[56] References Cited
UNITED STATES PATENTS

| | | |
|---|---|---|
| 3,666,495 | 5/1972 | Evers et al. .................... 426/535 |
| 3,677,772 | 7/1972 | Mussinan et al. .................... 426/535 |
| 3,702,253 | 11/1972 | Winter et al. .................... 426/535 X |

*Primary Examiner*—Joseph M. Golian
*Attorney, Agent, or Firm*—Arthur L. Liberman; Harold Haidt; Franklin D. Wolffe

[57] ABSTRACT

Methods for preparing medicinal products, chewing gums, foodstuffs, and flavoring compositions for medicinal products, chewing gums and foodstuffs by including therein bis (cyclohexyl) disulfide to produce in food flavorings chewing gum flavorings and medicinal product flavorings, incense/fruity, pungent, nutty sulfury (berry), minty, musty, and sweet notes or combinations of these, for improving the taste and aroma of artificial grape or other fruit flavoring compositions.

Bis (cyclohexyl) disulfide has the structure:

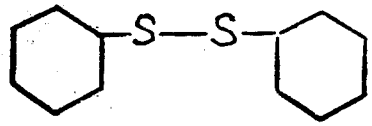

2 Claims, No Drawings

GRAPE FLAVOR COMPOSITIONS, FOODSTUFFS AND CHEWING GUM CONTAINING BIS (CYCLOHEXYL) DISULFIDE AND METHODS FOR PRODUCING SAME

This application is a continuation-in-part of U.S. application for Letters Patent Ser. No. 518,818, filed on Oct. 29, 1974, now U.S. Pat. No. 3,917,870 issued on Nov. 4, 1975, which, in turn, is a continuation-in-part of U.S. application for Letters Patent Ser. No. 401,665, filed on Sept. 28, 1973, now abandoned.

BACKGROUND OF THE INVENTION

The present invention relates to novel methods and compositions using bis (cyclohexyl) disulfide to alter the flavor and/or aroma of consumable materials.

There has been considerable work performed relating to substances which can be used to impart (or enhance) flavors to (or in) various consumable materials. These substances are used to diminish natural materials, some of which may be in short supply, and to provide more uniform properties in the finished product. Incense/fruity, pungent, nutty sulfury (berry), minty, musty and sweet flavor notes or combinations for improving the taste and aroma of articificial grape or other fruity flavoring compositions are particularly desirable for may uses in consumable articles, e.g. foodstuffs.

In U.S. Pat. No. 3,677,772, sulfide derivatives suitable for use in meat flavors are represented by the following structural formula:

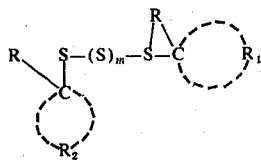

wherein R represents hydrogen of lower alkyl of 1 to 6 carbon atoms and $R_1$ represents the carbon atoms necessary to complete a cycloalkyl group, containing from 4 to 9 intracyclic carbon atoms and m is 1 or 2.

Also disclosed in U.S. Pat. No. 3,677,772 is the formulation of cycloalkyl mercaptans in situ with the remaining ingredients of the flavoring or foodstuff composition carried out by employing as the precursor, a mercaptal and/or hemimercaptal capable of yielding the desired cycloalkyl mercaptan by simple hydrolysis, e.g., at refluxing temperatures. Particularly described as suitable for such use is the mercaptal formed on the addition of acetaldehyde to cyclopentyl mercaptan, such mercaptal having the following structural formula:

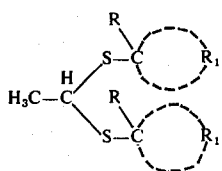

where R and $R_1$ have the aforedescribed significance.

Bis (cyclohexyl) disulfide is prepared according to the process set forth in U.S. Pat. No. 2,517,934 issued Aug. 8, 1950.

THE INVENTION

It has now been discovered that novel solid and liquid foodstuff, chewing gum and medicinal products and flavoring compositions therefor having incense/fruity, pungent, nutty sulfury-berry, minty, musty, and sweet flavor notes or combinations of these for improving the taste and aroma of artificial grape or other fruit flavoring compositions can be created by the utilization of bis (cyclohexyl) disulfide in favor formulae, and/or in foodstuffs, chewing gums and medicinal products.

When used as a food flavor or food additive or enhancer, either separately or in combination, the organoleptic properties of the bis (cyclohexyl) disulfide of our invention are described as follows:

"In 1% solution (food-grade ethanol) has a fruity, pungent, sulfury aroma and a sweet, nutty sulfury-berry taste with minty, bitter, musty notes. Its threshold level is 1 ppm."

When the bis (cyclohexyl) disulfide of our invention is used as a food flavor adjuvant, the nature of the coingredients included with the said bis (cyclohexyl) disulfide in formulating the product composition will also serve to alter the organoleptic characteristics of the ultimate foodstuffs treated therewith.

As used herein in regard to flavors, the terms "alter" and "modify" in their various forms means "supplying or imparting flavor character or note to otherwise bland, relatively tasteless substances or augmenting the existing flavor characteristic where a natural flavor or synthetic flavor or mixture of natural and synthetic flavors is deficient in some regard, or supplementing the existing flavor impression to modify its quality, character or taste."

As used herein, the term "enhance" is intended to mean the intensification (without effecting a change in kind of quality of aroma or taste) of one or more taste and/or aroma nuances present in the organoleptic impression of a consumable material, e.g. foodstuff, tobacco, chewing gum, medicinal product, perfume composition or perfumed article.

As used herein the term "foodstuff" includes both solid and liquid ingestible materials which usually do, but need not, have nutritional value. Thus, foodstuffs include soups, convenience foods, beverages, dairy products, candies, vegetables, cereals, soft drinks, snacks and the like.

As used herein the term "chewing gum" is intended to mean a composition which comprises a substantially water-insoluble, chewable plastic gum base such as chicle, or substitutes therefor, including jelutung, guttakay rubber and/or certain comestible natural or synthetic resins or waxes. Incorporated within the gum base, in admixture therewith may be plasticizers or softening agents, e.g. glycerine; and a flavoring composition which incorporates the bis (cyclohexyl) disulfide of our invention, and, in addition, sweetening agents which may be sugars, including sucrose or dextrose and/or artificial sweeteners including dipeptides, cyclamates and saccharin. Other optional ingredients may also be present.

The term "medicinal product" includes both solids and liquids which are ingestible, non-toxic materials having medicinal value such as cough syrups, cough drops, toothpaste, aspirin and chewable medicinal tablets as further exemplified herein. Substances suitable for use herein as co-ingredients or flavoring adjuvants are well known in the art for such use being extensively described in the relevant literature. Such material is required to be "ingestibly" acceptable and thus nontoxic or otherwise non-deleterious. Particluarly critical is the additional requirement that such material be organoleptically compatible with the bis (cyclohexyl) disulfide encompassed within the scope of our invention. Also critical is the additional requirement that such material be nonreactive (within the range of storage conditions and room temperature use conditions) with the bis (cyclohexyl) disulfide.

Accordingly, such materials which may in general be characterized as flavoring adjuvants or vehicles comprise boadly stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2- and 3-tertiary-butyl-4-hydroxyanisole), butylated hydroxy toluene (2,6-di-tertiary-butyl-4-methyl phenol), propyl gallate and the like, and sequestrants, e.g., citric acid.

Thickener compounds include carriers, binders, protective colloids, suspending agents, emulsifiers and the like, e.g., agaragar; carrageenan; cel and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g. mono-and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cohcineal, turmeric and curcumin and the like; firming agents such as aluminum sodium sulfate, calcium chloride and calcium gluconate; texturizers; anti-caking agents, e.g., aluminum clacium sulfate and tribasic calcium phosphate; enzymes; yeast food, e.g., calcium lactate and calcium sulfate; nutrient supplements, e.g., iron salts such as ferric phosphate, ferrous gluconate and the like, riboflavin, vitamins, zinc sources, such as zinc chloride, zinc sulfate and the like.

Other flavorants and flavor intensifiers include organic acid e.g., fatty saturated acids, unsaturated acids and amino acids; alcohols, e.g., primary and secondary alcohols, esters; carbonyl compounds, e.g., aldehydes and ketones as well as lactones; cyclic organic materials including benzene derivatives isocyclics, heterocyclics such as furans particularly 2,5-dimethyl-3-acetyl furan and 2-methyl-2,3 dihydro furan-3-one, pyridines,pyrazines (particularly monoalkyl, dialkyl, trialkyl and tetraalkyl substituted pyrazines) and the like, sulfur-containing materials including thiazoles, disulfides, thiols, sulfides, aldehydes (for example, 3-phenyl-4-pentenal, 3-phenyl-3-pentenal, 3-phenyl-2-pentenal, 2-phenyl-2-pentenal, and 2-phenyl-3-methyl-2-butenal); trisulfides and the like; other flavor potentiators such as monosodium glutamate, guanylates, inosinates, natural and synthetic flavorants such a vanillin, ethyl vanillin, diacetyl, phenethyl-2-furoate, maltol, natural gums and the like; spices, herbs, essential oils and extractives including "bitterness principles" such as theobromine, caffeine, naringin and other suitable materials creating a bitter effect.

The specific flavoring adjuvant selected for use may be either solid or liquid depending upon the desired physical form of the ultimate product, i.e., foodstuff, whether simulated or natural, and should, in any event, be capable of providing an environment in which the bis (cyclohexyl) disulfide can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of bis (cyclohexyl) disulfide employed in a particular instance can vary over a relatively wide range whereby to its desired organoleptic effects. All parts and percentages given herein are by weight unless otherwise specified. Thus, correspondingly, greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of bis (cyclohexyl) disulfide will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions it has been found that quantities of bis (cyclohexyl) disulfide ranging from a small but effective amount, e.g., 0.02 parts per billion up to about 0.1% (1000 parts per million) by weight based on total composition are suitable. Concentrations in excess of the maximum quantity stated are not normally recommended since they fail to provide commensurate enhancement of organoleptic properties. In those cases, wherein the bis (cyclohexyl) disulfide is added to the foodstuff as an integral component of the flavoring composition, it is, of course, essential that the total quantity of flavoring composition employed by sufficient to yield an effective bis (cyclohexyl) disulfide concentration in the foodstuff product.

Food flavoring compositions prepared in accordance with the present invention preferably contain bis (cyclohexyl) disulfide in concentrations ranging from about 0.0006% up to about 10% by weight based on a total weight of said flavoring composition.

The compositions described herein can be prepared according to conventional techniques well known as typified by cake batters and fruit juices and vegetable juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the bis (cyclohexyl) disulfide with for example gum arabic, gum tragacanth, carrageenan and the like and thereafter spray-drying the resultant mixture whereby to obtain the particular solid product. Pre-prepared flavor mixes in powder form, e.g., a red currant mix or a fruit flavored powder obtained by mixing dried solid components, e.g., starch, sugar and the like and bis (cyclohexyl) disulfide in a dry blender until the requisite degree of uniformity is achieved.

It is presently preferred to combine the bis (cyclohexyl) disulfide with the following adjuvants;
Methyl anthranilate;
Ethyl acetate;
Ethyl anthranilate;
Ethyl butyrate;
Ethyl methyl phenyl glycidate;
Cinnamic alcohol;
Amyl valerianate;
Cinnamyl propionate;
Rhodinyl acetate;
Methyl beta-hydroxy butyrate; and
Ethyl beta-hydroxy butyrate The following examples are given to illustrate embodiments of the invention as it is presently preferred to practice it. It will be understood that these examples are illustrative, and the invention is not to be considered as restricted thereto except as indicated in the appended claims.

EXAMPLE I

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.02 parts of bis (cyclohexyl) disulfide is added to the above flavor and a significant improvement in aroma and taste is noted. It is judged to be a better blended flavor, more nautral and reminiscent of natural grape. It imparts a certain mustiness and eliminates the typical methyl anthranilate character. It is a more rounded and natural flavor.

EXAMPLE II

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidifed aqueous tasting solution. 0.04 Parts of bis (cyclohexyl) disulfide is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE III

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.07 Parts of bis (cyclohexyl) disulfide is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE IV

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be acceptable grape flavor when evaluated in a sweetened and acidified aqueous tasting solution. 0.12 Parts of bis (cyclohexyl) disulfide is added to the above flavor and a significant improvement in aroma and taste is noted. It is judged to be a better blended flavor, more natural and reminiscent of natural grape. It imparts a certain mustiness and eliminates the typical anthranilate character. It is a more rounded and natural flavor.

EXAMPLE V

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.15 Parts of bis (cyclohexyl) disulfide is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE VI

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.20 Parts of bis (cyclohexyl) disulfide is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE VII

The following materials are separately added to the grape flavor formulation set forth supra:
a. Cyclohexyl mercaptan having the structure:

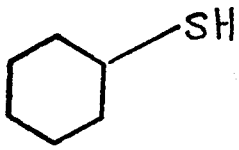

(U.S. Pat. No. 3,677,772; Mussinan)
b. Furfuryl valerate having the structure:

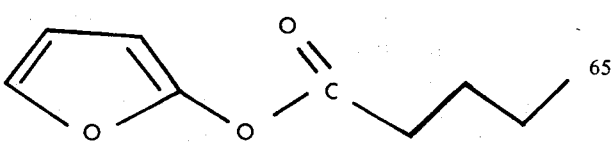

(U.S. Pat. No. 3,702,253; Winter et al.)
c. Bis (cyclohexyl) disulfide having the structure:

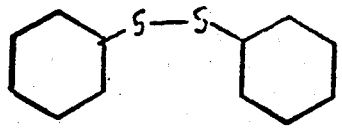

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 100 ppm in reconstituted grape juice prepared from the concentrate. The reconstituted grape juice produced using the test compounds in the above flavor formulation are then compared with one another and with reconstituted grape juice to which natural essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions

Comparing (a), (b) and (c) the only material which gives risé to advanyageous results when added to reconstituted grape juice or grape juice per se is material (c). Material (c) has unexpected, unobvious and advantageous qualities insofar as grape flavor is concerned when compared with the organoleptic properties of materials (c) and (b).

EXAMPLE VIII

The following materials are separately added to the grape flavor formulation set forth supra:
a. Cyclohexyl mercaptan having the structure:

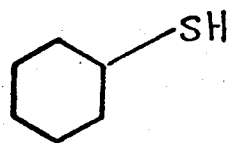

(U.S. Pat. No. 3,677,772; Mussinan)
b. Furfuryl valerate having the structure:

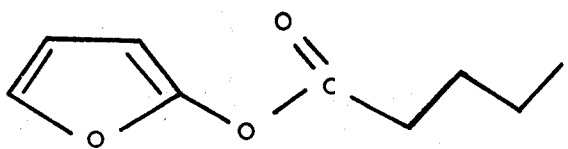

(U.S. Pat. No. 3,702,253; Winter et al.)
c. Bis (cyclohexyl) disulfide having the structure:

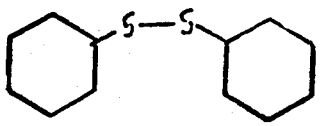

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 500 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful then the reconstituted grape juice to which the essence along is added.

Conclusions

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLES IX

The following materials are separately added to the grape flavor formulation set forth supra:
a. (Cyclohexyl mercaptor having the structure:

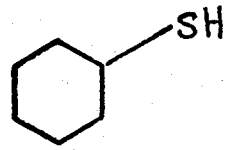

(U.S. Pat. No. 3,677,772; Mussinan)
b. Furfuryl valerate having the structure:

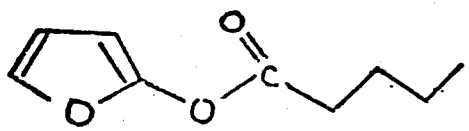

(U.S. Pat. No. 3,702,253; Winter et al.)
c. Bis (cyclohexyl) disulfide having the structure:

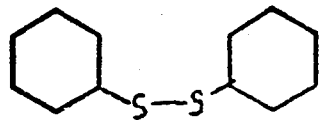

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.5% in reconstituted grape juice prepared from the concentrate. The reconstituted grape juice produced using the test compounds in the above flavor formulation are then compared with an another and with reconstituted grape juice to which natural grape essence along has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):

At the levels added material (b) is detrimental to the grape flavor and gives it a meaty quality.

c. Reconstituted grape juice with formulation containing (c) added:

The nautral grape juice and the reconstituted grape juice containing the formulation with (c) added are substantially familiar and substantially more flavorful than the reconstituted grape juice to which the essence along is added.

Conclusions

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE X

The following materials are separately added to the grape flavor formulation set forth supra:

a. Cyclohexyl mercaptan having the structure:

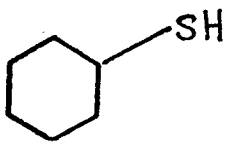

(U.S. Pat. No. 3,677,772; Mussinan)

b. Furfuryl valerate having the structure:

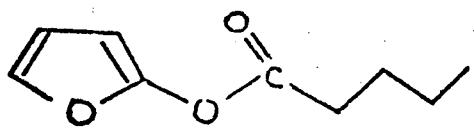

(U.S. Pat. No. 3,702,253; Winter et al.)

c. Bis (cyclohexyl) disulfide having the Structure:

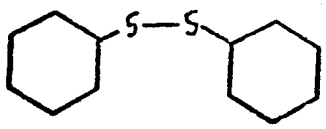

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 1% in reconstituted grape juice prepared from the concentrate. The reconstituted grape juice produced using the test compounds in the above flavor formulation are then compared with one another and with reconstituted grape juice to which natural grape essence along has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:

The natural grape juice and the reconstituted grape juice containing the formulation with (c) added are substantially familiar and substantially more flavorful than the reconstituted grape juice to which the essence alone is added.

Conclusions

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XI

20 Grams of the flavor formulation of each of Examples I–VI is emulsified in a solution containing 100 gms gum arabic and 300 gms water. The emulsion is spray-dried with a Bowen Lab Model Drier utilizing 250 c.f.m. of air with an inlet temperature of 500°F., and outlet temperature of 200°F., and a wheel speed of 50,000 r.p.m.

EXAMPLE XII

100 Parts by weight of chicle are mixed with 4 parts by weight of each of the flavors prepared in accordance with Example XI, 300 parts of sucrose and 100 parts of corn syrup are added. Mixing is effected in a ribbon blender with jacketed side walls of the type manufactured by the Baker Perkins Companay. The resulting material is formed into 1/6 1 × 3 × 0.1 slabs. Each slab of chewing gum has an excellent long lasting grape flavor.

What is claimed is:

1. A process for augmenting or enhancing the grape flavor or aroma of a foodstuff or a chewing gum which comprises adding thereto from 0.2 parts per billion up to 1000 parts per million of bis (cyclohexyl) disulfide based on the total weight of said foodstuff or chewing gum.

2. A grape flavor augmenting or enhancing composition containing (i) from about 0.006% up to about 10% by weight based on the total weight of said composition of bis (cyclohexyl) disulfide and (ii) as a flavor adjuvant at least one compound selected from the group consisting of methyl anthranilate, ethyl acetate, ethyl anthranilate, ethyl butyrate, ethyl methyl phenyl glycidate, cinnamic alcohol, amyl valerianate, cinnamyl propionate, rhodinyl acetate, methyl-betahydroxy butyrate and ethyl beta-hydoxy butyrate.

* * * * *

UNITED STATES PATENT AND TRADEMARK OFFICE
CERTIFICATE OF CORRECTION

PATENT NO. : 3,982,009
DATED : September 21, 1976
INVENTOR(S) : GARY SLANGAN, ALAN O. PITTET, CHRISTOPHER GIACINO, DENIS E. HRUZA, SR., AND EDWARD J. SHUSTER It is certified that error appears in the above-identified patent and that said Letters Patent are hereby corrected as shown below:

Col. 10, Line 11, the word "mercaptor" should read "mercaptan".

Col. 10, line 62, the word "along" should read "alone".

Signed and Sealed this

Twelfth Day of April 1977

[SEAL]

Attest:

RUTH C. MASON
*Attesting Officer*

C. MARSHALL DANN
*Commissioner of Patents and Trademarks*